(12) United States Patent
Zhou et al.

(10) Patent No.: US 12,196,885 B2
(45) Date of Patent: Jan. 14, 2025

(54) STRAY LIGHT SUPPRESSION DEVICE FOR BATHYMETRIC LIDAR ONBOARD UNMANNED SHIPBORNE

(71) Applicant: GUILIN UNIVERSITY OF TECHNOLOGY, Guilin (CN)

(72) Inventors: Guoqing Zhou, Guilin (CN); Zhexian Liu, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 0 days.

(21) Appl. No.: 18/557,926

(22) PCT Filed: Jun. 21, 2023

(86) PCT No.: PCT/CN2023/101726
§ 371 (c)(1),
(2) Date: Oct. 27, 2023

(87) PCT Pub. No.: WO2023/241724
PCT Pub. Date: Dec. 21, 2023

(65) Prior Publication Data
US 2024/0418832 A1    Dec. 19, 2024

(30) Foreign Application Priority Data
Jun. 18, 2022    (CN) .......................... 202210693579.9

(51) Int. Cl.
*G01C 3/08* (2006.01)
*G01S 7/481* (2006.01)
*G02B 25/00* (2006.01)

(52) U.S. Cl.
CPC ............ *G01S 7/481* (2013.01); *G02B 25/001* (2013.01)

(58) Field of Classification Search
CPC ........ G01S 17/08; G01S 7/481; G01S 7/4813; G02B 25/001
See application file for complete search history.

(56) References Cited

U.S. PATENT DOCUMENTS

| 5,947,051 A | * | 9/1999 | Geiger | .................... E21B 41/04 |
| | | | | 114/313 |
| 2021/0055418 A1 | * | 2/2021 | Hopper | ................. G01S 7/4816 |

FOREIGN PATENT DOCUMENTS

| CN | 200947136 Y | 9/2007 |
| CN | 105403877 A | 3/2016 |

(Continued)

OTHER PUBLICATIONS

Grant Decision issued by CNIPA for counterpart Chinese patent application No. 202210693579.9, dated Aug. 4, 2023.
(Continued)

*Primary Examiner* — Mark Hellner
(74) *Attorney, Agent, or Firm* — Platinum Intellectual Property PC

(57) ABSTRACT

The present disclosure relates to a stray light suppression device for bathymetric LiDAR onboard unmanned shipborne, belonging to the technical field of LiDAR water depth detection, particularly to a stray light suppression device for bathymetric LiDAR onboard unmanned shipborne. The device comprises an optical system component, a first objective lens barrel, a second objective lens barrel, a spectroscope barrel, a first eyepiece barrel a, a first eyepiece barrel b, a second eyepiece barrel a, a second eyepiece barrel b, a PMT detector a, a PMT detector b and a spectroscope supporting structure. Stray light suppression of an optical system with minimal field-of-view is realized, and stray light propagated by first-order, second-order and third-order scattered light paths is suppressed, so that a water depth (Continued)

detection capability of the bathymetric LiDAR onboard unmanned shipborne is improved and a dynamic detection range is expanded.

3 Claims, 3 Drawing Sheets

(56) References Cited

FOREIGN PATENT DOCUMENTS

| CN | 107037444 | A |   | 8/2017  |           |
|----|-----------|---|---|---------|-----------|
| CN | 110542893 | A | * | 12/2019 | G01S 7/4816 |
| CN | 209878985 | U | * | 12/2019 | G01S 7/481 |
| CN | 212586558 |   |   | 2/2021  |           |
| CN | 113848565 | A |   | 12/2021 |           |
| CN | 114166340 | A | * | 3/2022  | G02B 27/00 |
| CN | 114488077 | A |   | 5/2022  |           |

OTHER PUBLICATIONS

The first office action issued by CNIPA for counterpart Chinese patent application No. 202210693579.9, dated Jun. 5, 2023.
Zhou Guoqing, et al.; Design of LiDAR optical machine system for airborne single frequency bathymetry, Infrared and Laser Engineering, VO1.50 No.4, Apr. 30, 2021.

* cited by examiner

STRAY LIGHT SUPPRESSION DEVICE FOR BATHYMETRIC LIDAR ONBOARD UNMANNED SHIPBORNE

RELATED APPLICATIONS

This application is a United States National Stage Application filed under 35 U.S.C § 371 of PCT Patent Application Serial No. PCT/CN2023/101726, filed Jun. 21, 2023, which claims priority to Chinese Patent Application Serial No. CN 2022106935799, filed Jun. 18, 2022, the disclosure of all of which are hereby incorporated by reference in their entirety.

TECHNICAL FIELD

The present invention relates to the technical field of bathymetric LiDAR for water depth detection, in particular to a stray light suppression device for bathymetric LiDAR onboard unmanned shipborne due to water surface reflection and water body scattering during laser water entry.

BACKGROUND

In shallow water areas and inland water areas, a water depth detection LiDAR is an efficient sounding technology to obtain water depth information for the study of riverbed topography, marine habitat near coasts, coastal management and flood research. Stray light of the water depth detection LiDAR mainly comes from abnormal paths such as the reflection of sunlight on a water surface and the scattering of laser incident water to form noises at a system detector. The stray light leads to saturation or even complete annihilation of signals acquired by the water depth detection LiDAR, and has a lot of noisy points, which leads to the failure of an optical system and the inability to obtain accurate water depth information. In order to ensure the normal operation of the optical system of the water depth detection LiDAR, it is necessary to suppress the stray light.

At present, the commonly used methods to eliminate the stray light are as follows: (1) a hood and a light blocking ring are employed outside the optical system. (2) Field stops and aperture stops are used for stray light suppression. (3) A coating with high absorption rate is sprayed. These stray light elimination methods cannot be applied to a water detection LiDAR, since they require a very small field of view, and are only suitable for eliminating stray light once, which cannot effectively suppress subsequent high-order stray light propagation.

SUMMARY

Aiming at the problems that it is difficult to suppress stray light in a transmission optical system with minimal field-of-view, and an outer hood cannot be used for suppression, the present invention discloses a stray light suppression device for bathymetric LiDAR onboard unmanned shipborne, which can effectively suppress full-path stray light outside a working field-of-view.

In order to achieve the above object, technical solutions of a stray light suppression device for bathymetric LiDAR onboard unmanned shipborne of the present invention is as follows:

A stray light suppression device for bathymetric LiDAR onboard unmanned shipborne according to the present invention comprises an optical system component and an optical system component supporting structure, wherein the optical system component supporting structure comprises a first objective lens barrel, a second objective lens barrel, a spectroscope barrel, a first eyepiece barrel a, a first eyepiece barrel b, a second eyepiece barrel a, a second eyepiece barrel b, a PMT detector a, a PMT detector b and a spectroscope supporting structure;

inner walls of the first objective lens barrel and the second objective lens barrel are provided with 90-degree baffle blades, edges of the blades are inclined at 45 degrees, and the inclined surfaces face outsides of the lens barrels;

an objective lens is arranged in the first objective lens barrel, and the second objective lens barrel links the first objective lens barrel with the spectroscope barrel;

a plane reflector with a central opening is arranged in the spectroscope barrel, and the spectroscope barrel is connected with the first eyepiece barrel a and the first eyepiece barrel b;

an entrance of the spectroscope barrel is provided with a grooved baffle blade, and two exits of the spectroscope barrel are both provided with an extinction thread;

the first eyepiece barrel a and the first eyepiece barrel b are provided with first eyepieces, and are connected with the spectroscope barrel; and the second eyepiece barrel a and the second eyepiece barrel b are provided with second eyepieces, and link the first eyepiece barrel a and the first eyepiece barrel b with the PMT detector a and the PMT detector b.

The first objective lens barrel, the second objective lens barrel, the first eyepiece barrel a, the first eyepiece barrel b, the second eyepiece barrel a and the second eyepiece barrel b are all cylindrical structures.

The present invention has the beneficial effect that the stray light outside the field-of-view of the bathymetric LiDAR onboard unmanned shipborne optical system is suppressed, and has the following advantages that: (1) defects of a conventional external hood are abandon, and stray light suppression of the optical system with minimal field-of-view is realized; (2) the stray light propagated by the first-order, second-order and third-order scattered light paths can be effectively suppressed; and (3) a detection capacity of water depth near the surface of the bathymetric LiDAR onboard unmanned shipborne is improved and a dynamic detection range of the bathymetric LiDAR onboard unmanned shipborne is enlarged.

DETAILED DESCRIPTION

In order to make the above objects, results and functions of the present invention be more clearly understood, the specific implementation of a stray light suppression device for bathymetric LiDAR onboard unmanned shipborne of the present invention will be further described in detail with reference to the drawings.

Figure 1:
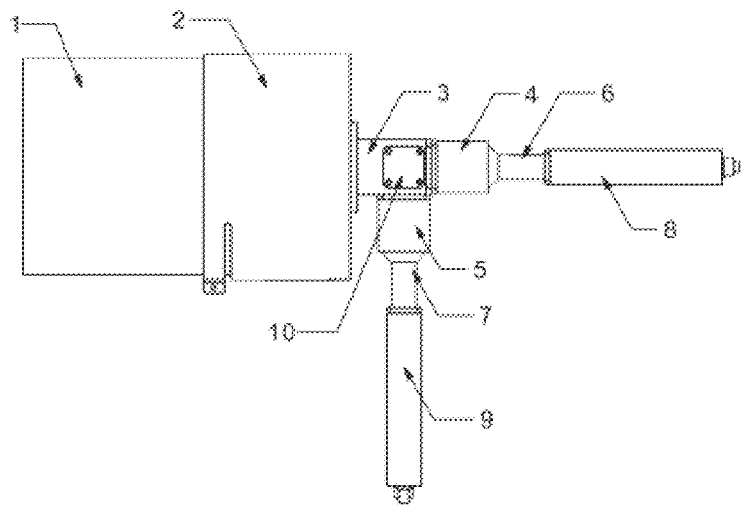
FIG. 1 is a plan view of a stray light suppression device for bathymetric LiDAR onboard unmanned shipborne according to the present invention, wherein 1 refers to first objective lens barrel, 2 refers to second objective lens barrel, 3 refers to spectroscope barrel, 4 refers to first eyepiece barrel a, 5 refers to first eyepiece barrel b, 6 refers to second eyepiece barrel a, 7 refers to second eyepiece barrel b, 8 refers to PMT detector a, 9 refers to PMT detector b, and 10 refers to spectroscope supporting structure.
Figure 2:
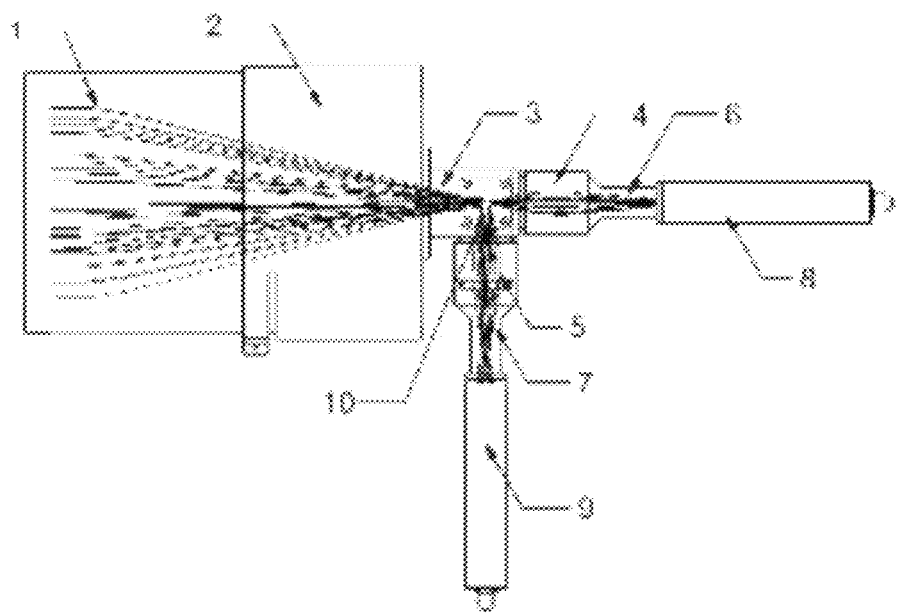
FIG. 2 is a full path diagram of the stray light suppression device for bathymetric LiDAR onboard unmanned shipborne in a working field-of-view according to the present invention.

With reference to FIG. 1, a stray light suppression device for bathymetric LiDAR onboard unmanned shipborne according to the present invention comprises a first objective lens barrel 1, one end of the first objective lens barrel 1 is connected with a second objective lens barrel 2, a front end of the second objective lens barrel 2 wraps the first objective lens barrel 1, and a rear end of the second objective lens barrel 2 is connected with a spectroscope barrel 3; a front end of the spectroscope barrel 3 is connected with the second objective lens barrel 2, a rear end and a side end of the spectroscope barrel 3 are respectively connected with a first eyepiece barrel a 4 and a first eyepiece barrel b 5, and an upper end of the spectroscope barrel 3 is linked to the spectroscope supporting structure 10; a front end of the first eyepiece barrel a 4 is connected with the spectroscope barrel 3, and a rear end of the first eyepiece barrel a 4 is connected with a second eyepiece barrel a 6; a front segment of the second eyepiece barrel a 6 wraps the first eyepiece barrel a 4, and a rear end of the second eyepiece barrel a 6 is connected with a PMT detector a 8; and a front segment of a second eyepiece barrel b 7 wraps the first eyepiece barrel b 5, and a rear end of the second eyepiece barrel b 7 is connected with a PMT detector b 9.

Figure 3:
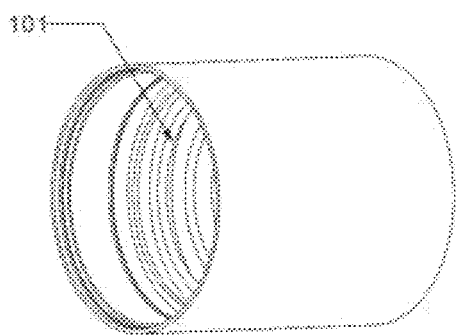
FIG. 3 is a structural schematic diagram of the first objective lens barrel of the stray light suppression device for bathymetric LiDAR onboard unmanned shipborne according to the present invention, wherein 101 refers to a first baffle blade group in an edge of which is inclined outwards by 45 degrees with an increasing size.

With reference to FIG. 3, a first baffle blade group 101 is arranged on an inner wall of the first objective lens barrel 1, and an edge of the first baffle blade group 101 is inclined outwards by 45 degrees with an increasing size.

Figure 4:
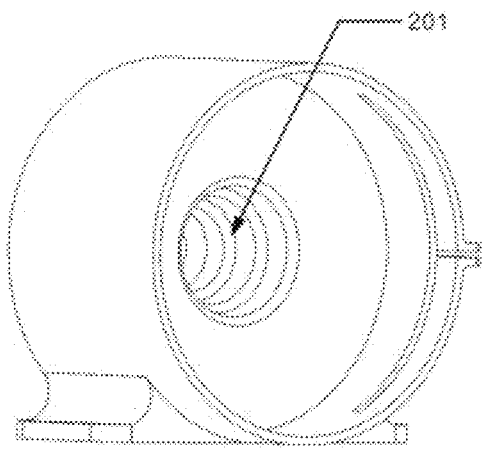
FIG. 4 is a structural schematic diagram of the second objective lens barrel of the stray light suppression device for bathymetric LiDAR onboard unmanned shipborne according to the present invention, wherein 201 refers to a second baffle blade group in an edge of which is inclined outwards by 45 degrees with an increasing size.

With reference to FIG. 4, a second baffle blade group 201 is arranged on an inner wall of the second objective lens barrel 2, and an edge of the first baffle blade group 201 is inclined outwards by 45 degrees with an increasing size.

Figure 5:
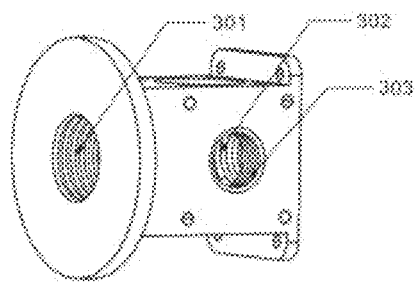
FIG. 5 is a structural schematic diagram of the spectroscope barrel of the stray light suppression device for bathymetric LiDAR onboard unmanned shipborne according to the present invention, wherein 301 refers to a grooved baffle blade, 302 refers to a first extinction thread and 303 refers to a second extinction thread.
Figure 6:
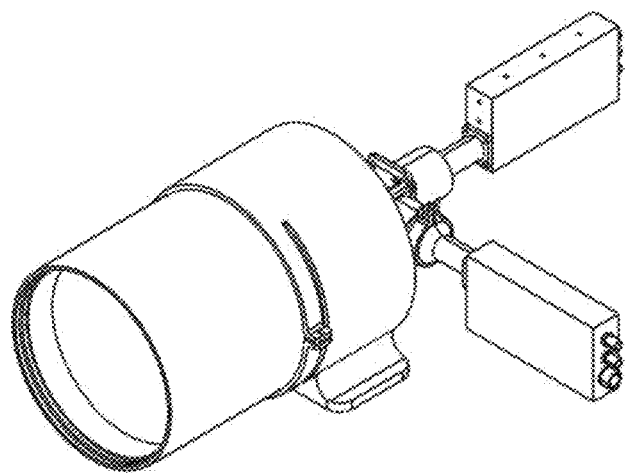
FIG. 6 is a schematic diagram of the three-dimensional structure of the stray light suppression device for bathymetric LiDAR onboard unmanned shipborne according to the present invention.

With reference to FIG. 5, a grooved blade 301 is arranged at the front end of the spectroscope barrel 3, a first extinction thread 302 is arranged at the rear end of the spectroscope barrel 3, a second extinction thread 303 is arranged at a side surface of the spectroscope barrel 3, and the edge of the second baffle blade group 201 is inclined outwards by 45 degrees with an increasing size.

Working Principle

The laser light enters a water body, enters the optical system after being reflected by a water surface and a water bottom, enters the first objective lens barrel 1, passes through an objective lens, then passes through the second objective lens barrel 2, and enters the spectroscope barrel 3, then the light irradiates a spectroscope, and one light beam is divided by the spectroscope to enter a rear end of the spectroscope barrel 3, enters the first eyepiece barrel a 4, passes through a first eyepiece and an optical filter, enters the second eyepiece barrel a 6, passes through a second eyepiece, then reaches a detection surface of the PMT detector a 8, enters a side surface of the spectroscope barrel 3, enters the first eyepiece barrel b 5, passes through the first eyepiece and the optical filter, enters the second eyepiece barrel b 7, passes through the second eyepiece, then reaches a detection surface of the PMT detector b 9, and completes water depth detection.

In order to suppress stray light generated by sunlight refracted by the water surface and laser scattered and diffusely reflected by the water body, the first objective lens barrel 1, the second objective lens barrel 2 and the spectroscope barrel 3 are designed according to actual angle ray tracing to realize stray light suppression of a transmission type optical system under minimal field-of-view.

Stray light propagated by first-order, second-order and third-order scattered light paths is suppressed under the combined action of a first baffle blade group 101, a second baffle blade group 201 and a grooved blade 301, a first extinction threads 302 and a second extinction threads 303 further suppress the stray light escaping to a subsequent light path, effectively suppress the stray light entering a PMT detection surface, and reduce interference on water body detection.

The above embodiments are only used to illustrate the present invention, but are not intended to limit the present invention. Those of ordinary skills in the art can make various changes and modifications without departing from the spirit and scope of the present invention. Therefore, all equivalent technical solutions also belong to the scope of the present invention, and the patent protection scope of the present invention should be defined by the claims.

The technical contents not described in detail in the present invention are all prior art.

What is claimed is:

1. A stray light suppression device for bathymetric LiDAR onboard an unmanned shipborne, comprising an optical system component and an optical system component supporting structure, wherein the optical system component supporting structure comprises a first objective lens barrel (1), a second objective lens barrel (2), a spectroscope barrel (3), a first eyepiece barrel a (4), a first eyepiece barrel b (5), a second eyepiece barrel a (6), a second eyepiece barrel b (7), a PMT detector a (8), a PMT detector b (9) and a spectroscope supporting structure (10); the stray light suppression device is further characterized by stray light suppression of an optical system component with minimal field-of-view; and is further characterized by comprising a structure and operation of the stray light suppression device for bathymetric LiDAR onboard an unmanned shipborne;

wherein a the structure of the optical system component supporting structure of the stray light suppression device for bathymetric LiDAR onboard an unmanned shipborne is further configured such that the first objective lens barrel (1), one end of the first objective lens barrel (1) is connected with the second objective lens barrel (2), a front end of the second objective lens barrel (2) wraps the first objective lens barrel (1), and a rear end of the second objective lens barrel (2) is connected with the spectroscope barrel (3); a front end of the spectroscope barrel (3) is connected with the second objective lens barrel (2), a rear end and a side end of the spectroscope barrel (3) are respectively connected with the first eyepiece barrel a (4) and the first eyepiece barrel b (5), and an upper end of the spectroscope barrel (3) is linked to the spectroscope supporting structure (10); a front end of the first eyepiece barrel a (4) is connected with the spectroscope barrel (3), and a rear end of the first eyepiece barrel a (4) is connected with the second eyepiece barrel a (6); a front segment of the second eyepiece barrel a (6) wraps the first eyepiece barrel a (4), and a rear end of the second eyepiece barrel a (6) is connected with the PMT detector a (8); and a front segment of the second eyepiece barrel b (7) wraps the first eyepiece barrel b (5), and a rear end of the second eyepiece barrel b (7) is connected with the PMT detector b (9); and operation of the stray light suppression device for bathymetric LiDAR onboard an unmanned shipborne is as follows: light from a laser source enters a water body, enters the optical system after being reflected by a water surface and a water bottom, enters the first objective lens barrel (1), passes through an objective lens, then passes through the second objective lens barrel (2), and enters the spectroscope barrel (3), then the light irradiates a spectroscope, and one light beam is divided by the spectroscope to enter a rear end of the spectroscope barrel (3), enters the first eyepiece barrel a (4), passes through a first eyepiece and an optical filter, enters the second eyepiece barrel a (6), passes through a second eyepiece, then reaches a detection surface of the PMT detector a (8), enters a side surface of the spectroscope barrel (3), enters the first eyepiece barrel b (5), passes through the first eyepiece and the optical filter, enters the second eyepiece barrel b (7), passes through a second eyepiece, then reaches a detection surface of the PMT detector b (9), and completes water depth detection.

2. The stray light suppression device for bathymetric LiDAR onboard an unmanned shipborne according to claim 1, wherein the structure and operation for bathymetric LiDAR onboard unmanned shipborne are further configured as:

a first baffle blade group (101) is arranged on an inner wall of the first objective lens barrel (1), and an edge of the first baffle blade group (101) is inclined outwards by 45 degrees with an increasing size;

a second baffle blade group (201) is arranged on an inner wall of the second objective lens barrel (2), and an edge of the second baffle blade group (201) is inclined outwards by 45 degrees with an increasing size; and a grooved blade (301) is arranged at the front end of the spectroscope barrel (3), a first extinction thread (302) is arranged at the rear end of the spectroscope barrel (3), a second extinction thread (303) is arranged at a side surface of the spectroscope barrel (3), and edges of the grooved blade (301) are inclined surfaces inclined inside and outside respectively.

3. The stray light suppression device for bathymetric LiDAR onboard an unmanned shipborne according to claim 1, wherein a working principle of the stray light suppression device is as follows:

in order to suppress stray light generated by sunlight refracted by the water surface and laser scattered and diffusely reflected by the water body, the first objective lens barrel (1), the second objective lens barrel (2) and the spectroscope barrel (3) are designed according to actual angle ray tracing to realize stray light suppression of a transmission type optical system under minimal field-of-view;

wherein, stray light propagated by first-order, second-order and third-order scattered light paths is suppressed under the combined action of a first baffle blade group (101), a second baffle blade group (201) and a grooved blade (301), a first extinction threads (302) and a second extinction threads (303) further suppress the stray light escaping to a subsequent light path, effectively suppress the stray light entering a PMT detection surface, and reduce interference on water body detection.

* * * * *